United States Patent
Horn et al.

(10) Patent No.: US 12,084,168 B2
(45) Date of Patent: *Sep. 10, 2024

(54) GEOMETRY-BASED FLIGHT CONTROL SYSTEM

(71) Applicant: Kitty Hawk Corporation, Palo Alto, CA (US)

(72) Inventors: Gregory Mainland Horn, Mountain View, CA (US); Damon Vander Lind, Alameda, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 348 days.

This patent is subject to a terminal disclaimer.

(21) Appl. No.: 17/374,646

(22) Filed: Jul. 13, 2021

(65) Prior Publication Data

US 2022/0033065 A1 Feb. 3, 2022

Related U.S. Application Data

(63) Continuation of application No. 15/880,315, filed on Jan. 25, 2018, now Pat. No. 11,091,247, which is a
(Continued)

(51) Int. Cl.
*B64C 13/18* (2006.01)
*B64C 13/04* (2006.01)
(Continued)

(52) U.S. Cl.
CPC .............. *B64C 13/18* (2013.01); *B64C 13/04* (2013.01); *B64C 13/503* (2013.01);
(Continued)

(58) Field of Classification Search
CPC ....... B64C 13/18; B64C 13/04; B64C 13/503; B64C 29/0033; B64D 31/06; B64D 2045/0085; G05D 1/0808
(Continued)

(56) References Cited

U.S. PATENT DOCUMENTS 5,823,468 A * 10/1998 Bothe ................. B64B 1/34
244/209
7,255,306 B2 8/2007 Jones
(Continued)

FOREIGN PATENT DOCUMENTS

EP 3208190 A1 * 8/2017 ............. B64C 13/18

OTHER PUBLICATIONS

U.S. Appl. No. 15/297,029, filed Oct. 18, 2016.

*Primary Examiner* — Nga X Nguyen
(74) *Attorney, Agent, or Firm* — Van Pelt, Yi & James LLP

(57) ABSTRACT

A geometry-based flight control system is disclosed. In various embodiments, a set of inceptor inputs associated with a requested set of forces and moments to be applied to the aircraft is received. An optimal mix of actuators and associated actuator parameters to achieve to an extent practical the requested forces and moments is computed, including by taking into consideration dynamically varying effectiveness of one or more actuators based on a current dynamic state of the aircraft. An output comprising for each actuator in the optimal mix a corresponding set of one or more control signals associated with the set of actuator parameters computed for that actuator is provided.

21 Claims, 15 Drawing Sheets

Related U.S. Application Data continuation of application No. 15/593,819, filed on May 12, 2017, now Pat. No. 9,908,616.

(51) Int. Cl.
  *B64C 13/50*   (2006.01)
  *B64C 29/00*   (2006.01)
  *B64D 31/06*   (2024.01)
  *G05D 1/00*    (2006.01)
  *G05D 1/08*    (2006.01)
  *B64D 45/00*   (2006.01)

(52) U.S. Cl.
  CPC .......... *B64C 29/0033* (2013.01); *B64D 31/06* (2013.01); *G05D 1/0808* (2013.01); *B64D 2045/0085* (2013.01)

(58) Field of Classification Search
  USPC .................................................. 701/3, 4, 5
  See application file for complete search history.

(56) References Cited

U.S. PATENT DOCUMENTS

| | | | |
|---|---|---|---|
| 8,523,102 B2 | 9/2013 | Shue | |
| 9,908,616 B1* | 3/2018 | Horn | B64C 29/0033 |
| 10,370,099 B2 | 8/2019 | Mahboubi | |
| 11,091,247 B1* | 8/2021 | Horn | B64C 13/18 |
| 2004/0107013 A1* | 6/2004 | Fuller | G05B 13/042 700/74 |
| 2009/0152404 A1* | 6/2009 | Yount | G05D 1/0061 244/194 |
| 2012/0095621 A1 | 4/2012 | Zhu | |
| 2013/0124177 A1* | 5/2013 | Falangas | G05B 17/02 703/8 |
| 2014/0209751 A1 | 7/2014 | Stagmer | |
| 2017/0121034 A1 | 5/2017 | Fisher | |
| 2017/0153650 A1* | 6/2017 | Chang | B64C 39/024 |
| 2018/0370624 A1 | 12/2018 | Seale | |

* cited by examiner

GEOMETRY-BASED FLIGHT CONTROL SYSTEM

CROSS REFERENCE TO OTHER APPLICATIONS

This application is a continuation of U.S. patent application Ser. No. 15/880,315, entitled GEOMETRY-BASED FLIGHT CONTROL SYSTEM filed Jan. 25, 2018, which is a continuation of U.S. patent application Ser. No. 15/593,819, now U.S. Pat. No. 9,908,616, entitled GEOMETRY-BASED FLIGHT CONTROL SYSTEM filed May 12, 2017, each of which is incorporated herein by reference for all purposes.

BACKGROUND OF THE INVENTION

Flight control systems (sometimes referred to as "flight controllers") translate inputs received from manually operated pilot controls, such as one or more of a roll stick, rudder pedals, pitch stick, collective, and throttle controls, etc., referred to collectively herein as "inceptors", and/or inputs from one or more sensors (e.g., air speed) into commands to the flight control assets of the aircraft, which may include one or more of control surfaces, such as rudders, ailerons, elevators, etc.; sources of forward thrust, such as propellers or jet engines; powered sources of lift such as rotors or lift fans; and forces capable of being directed or otherwise controlled or concentrated through use of nozzles, diverters, physical structures onto which engine or fan thrust may be directed, such as vanes, etc. and/or rotation of thrust generating devices.

Each of the foregoing, and/or other equipment and structures, may be used to affect one or more of the speed, direction, and attitude/orientation of the aircraft, and depending on the input each may be able to contribute to satisfying a command/input received via one or more inceptors. Aerodynamic control surfaces, powered sources of control forces, such as lift fans, and other structures capable of affecting aircraft attitude, motion, and/or orientation are referred to collectively herein as "actuators".

An aircraft typically is considered to have six degrees of freedom of movement, including forces in the forward/back, side/side, and up/down directions (corresponding to forces in three axes Fx, Fy, and Fz) and moments about the longitudinal (roll) axis, the transverse (pitch) axis, and the vertical (yaw) axis (corresponding to moments in three axes Mx, My, and Mz). If an aircraft has more actuators than degrees of freedom, it must be determined how the various actuators will be used to act on the aircraft in response to commands received via the inceptors or sensors. For a given set of one or more pilot commands under given circumstances, some combinations of actuators capable of acting on the aircraft to achieve the result indicated by the pilot command(s) may be more effective and/or efficient than others. For example, some may consume more or less power and/or fuel than others, provide a more smooth transition from a current state than others, etc. Considered circumstances may include the current position of the aircraft. In the event of an aircraft with dynamic geometry, the position of an aircraft component (e.g. a tiltwing) may be considered in determining the actuator commands. Constraints such as evenly distributed thrusts or actuator limitations may be considered in determining the actuator commands. Even for systems that are not over-actuated, it is necessary to determine what combination of actuation commands results in the desired motion and how to manage saturation issues or enforce system constraints.

In prior systems, attempts have been made to pre-compute, offline, combinations of actuators and associated parameters (e.g., position, speed, other parameters) to respond to different combinations of inceptor input using heuristics and/or engineering judgement. However, typically it is not possible to determine in advance every combination of actuators and associated parameters that may be required under all possible conditions and circumstances.

BRIEF DESCRIPTION OF THE DRAWINGS

Various embodiments of the invention are disclosed in the following detailed description and the accompanying drawings.

DETAILED DESCRIPTION

Figure 1:
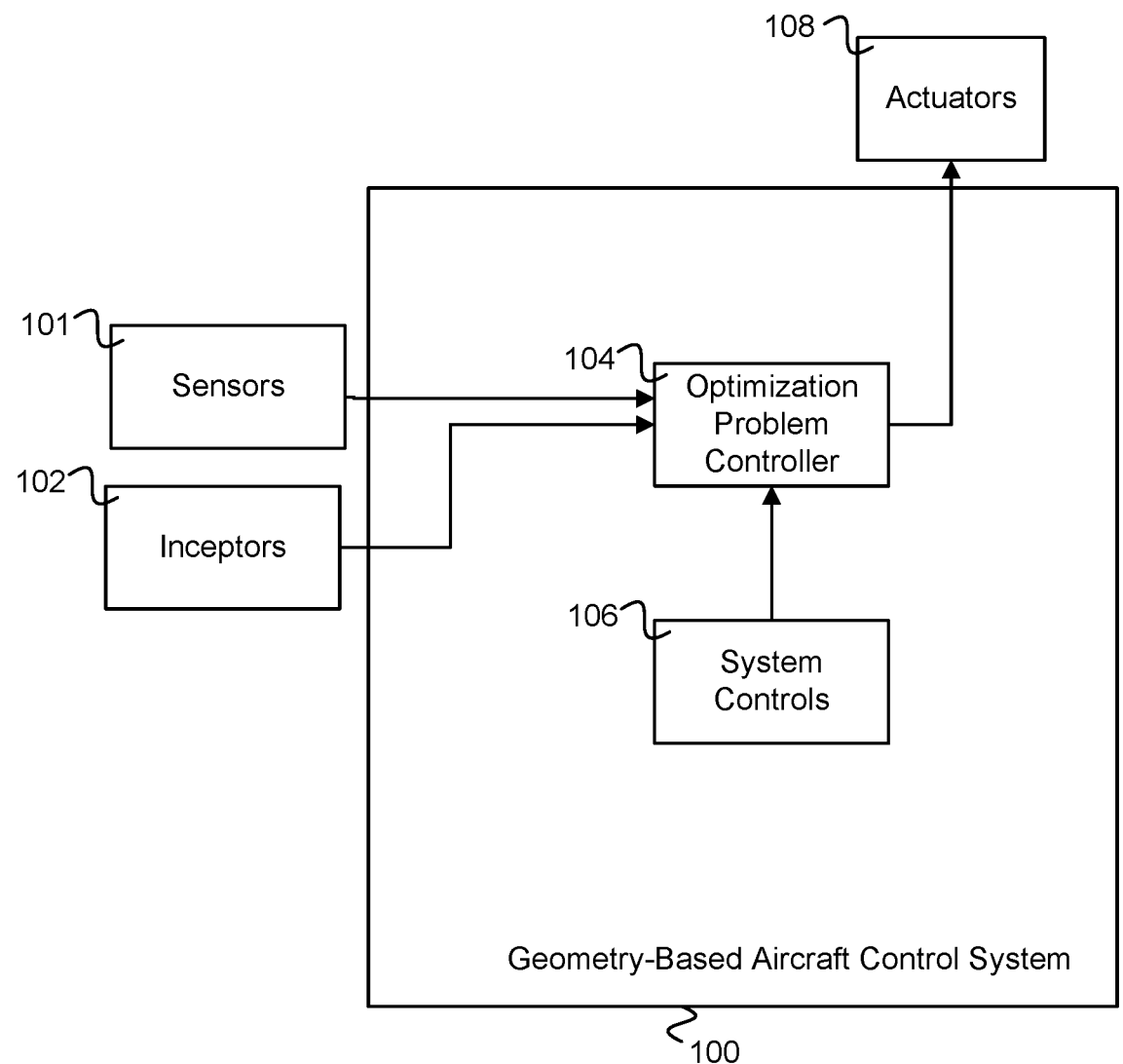
FIG. 1 is a diagram illustrating an embodiment of a geometry-based flight control system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A geometry-based flight control system is disclosed. The geometry-based flight control system receives a set of inputs associated with a requested set of forces and moments to be applied to the aircraft and computes an optimal mix of actuators and associated actuator parameters to achieve to an extent practical the requested forces and moments. Computing the optimal mix of actuators and associated actuator parameters includes taking into consideration dynamically varying effectiveness of one or more actuators based on a dynamic state of the aircraft. For example, the dynamic state may comprise an angle of a tiltwing of the aircraft or an angle of a tilt rotor of the aircraft.

In some embodiments, the flight control system allows a user to input an aircraft's geometry information and desired flight trajectory and receive a set of actuator commands that achieve the desired flight trajectory. The flight control system may be portable to various types of aircraft. Aircraft geometry information may comprise the shape and physical attributes of the aircraft. The flight control system accounts for dynamic aircraft geometry. For example, an aircraft with tilt wings has different aircraft geometry at different points in flight based on the tilt angle of the wings. The flight control system may determine actuator commands based on the real-time tilt angle of the wings. In some embodiments, the geometry-based flight control system provides real-time, online optimization. The system may provide optimized actuator commands that allow the aircraft to utilize its full capabilities.

FIG. 1 is a diagram illustrating an embodiment of a geometry-based flight control system. In the example shown, geometry-based flight control system 100 comprises optimization problem controller 104 and system controls 106. Sensors 101, inceptors 102, and system controls 106 provide inputs to optimization problem controller 104. Optimization problem controller 104 outputs actuator commands to actuators 108.

Sensors 101 may comprise an accelerometer, thermometer, barometer, gyroscope, radar, sonar, or any appropriate sensor. The sensors may be positioned on the aircraft and provide sensor data relevant to said aircraft. Sensors 101 may provide information on the aircraft's current state and environment to optimization problem controller 104. Information on the aircraft's current state may comprise airspeed, attitude, position, wing tilt angles, control surface tilt angles, or any other appropriate information. Inceptors 102 may comprise aircraft controls such as a joystick, trigger, lever, electronic interface, or any other appropriate apparatus. Inceptors 102 may be controlled by a pilot in the aircraft or on ground. Inceptors 102 may provide information to optimization problem controller 104 regarding a desired course of flight or action for the aircraft.

Optimization problem controller 104 may comprise an interface and processor. Optimization problem controller 104 may determine, based at least in part on the sensor data and inceptor information, an optimal set of actuator commands that achieve the desired flight trajectory. The optimization problem controller may comprise a control loop that determines a set of forces and moments required to achieve the flight trajectory as instructed via the inceptors. The optimization problem controller may further determine geometry information regarding the aircraft. Geometry/performance matrices containing information on expected impact or effects of actuators of the aircraft based on the geometry (e.g. current positioning of the aircraft and aircraft components) of the aircraft may be determined. The geometry matrices may be affected by non-geometric dynamic factors as well, such as airspeed. The geometry matrices may be calculated based on the current state of the aircraft, accounting for changing states. The effect of the various actuators included in an aircraft on forces and/or moments along and/or about the respective axes of the aircraft (e.g., x, y, and z; longitudinal, transverse, and vertical; etc.) may be determined based on actuator attributes and aircraft geometry. In some embodiments, actuator effectiveness under different operating conditions (e.g., airspeed, temperature, etc.) may be taken into consideration. Based on the required forces and moments and geometry information, the optimization problem controller may determine actuator parameters that achieve (within an acceptable margin of error) the required moments and forces. The parameters may be provided in the form of commands to the actuators.

System controls 106 may comprise variables, constraints, or other factors that affect the resulting actuator commands. A pilot or other relevant body may use the system controls to tweak the flight control system while the aircraft in is flight or grounded. The system controls may be used to penalize utilizing a certain actuator, establish maximum and minimums on the commanded actuator parameters, or otherwise modify the optimization performed by the optimization problem controller.

Figure 2:
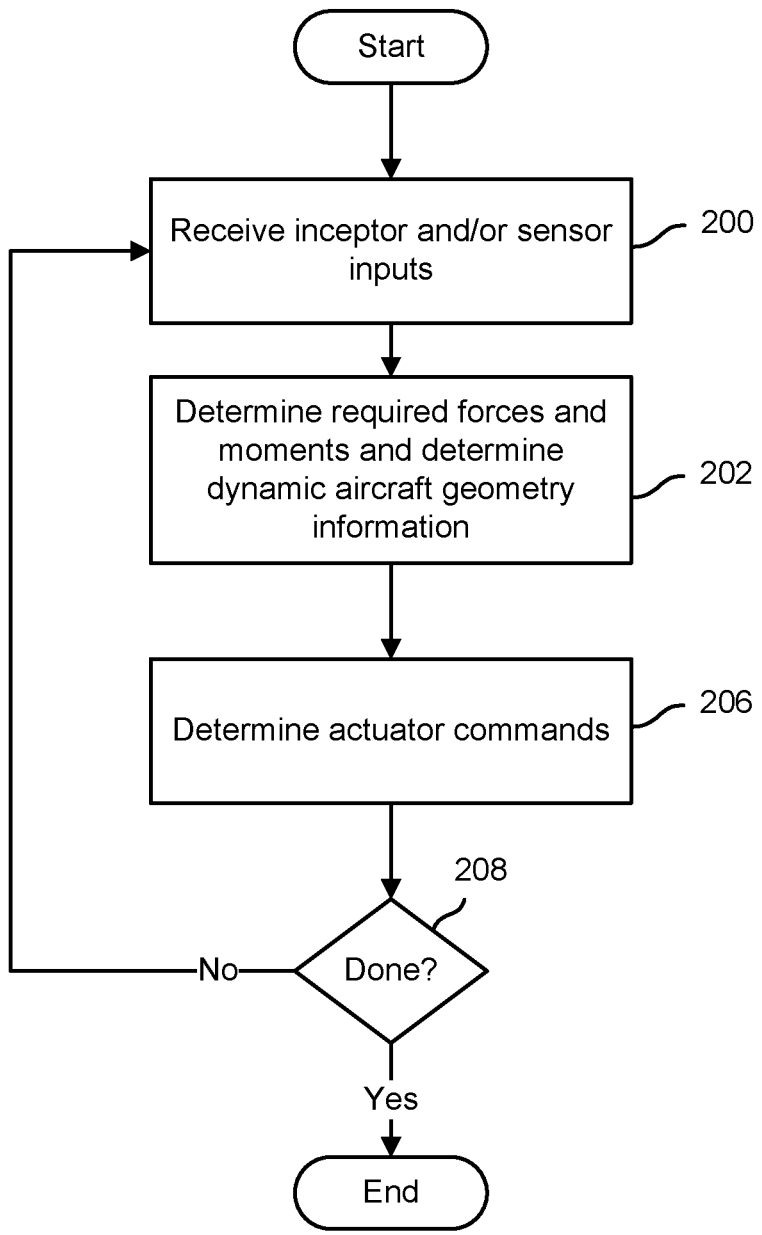
FIG. 2 is a flow diagram illustrating an embodiment of a geometry-based flight control process.

FIG. 2 is a flow diagram illustrating an embodiment of a geometry-based flight control process. At 200, inceptor and/or sensor inputs are received. A desired flight trajectory and current aircraft positioning information are received. At 202, required forces and moments are determined. Dynamic aircraft geometry information is also determined. The required forces and moments may be determined based on the desired flight trajectory. The dynamic aircraft geometry information may comprise models, matrices, or other data regarding the aircraft's position and the effect on actuators. At 206, actuator commands are determined. The actuator commands may be provided to the actuators. Subsequent iterations are repeated until the flight control process is done (208), e.g., the aircraft lands and is shut down.

Figure 3A:
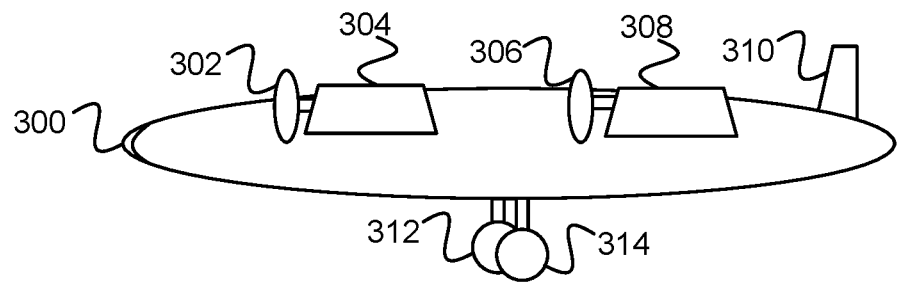
FIG. 3A is a diagram illustrating an embodiment of a tiltwing aircraft.

FIG. 3A is a diagram illustrating an embodiment of a tiltwing aircraft. In some embodiments, the geometry-based flight control system is used in a tiltwing aircraft. In various embodiments, the system may be used in a helicopter, multicopter, or any appropriate vehicle. In the example shown, aircraft 300 comprises wings 304 and 308. The wings are positioned parallel with the fuselage of the aircraft, e.g. in a non-tilted state. Multiple rotors may be present on each wing. As shown, rotor 302 is attached to the front of wing 304 and rotor 306 is attached to the front of wing 308. Each wing may comprise two rotors, one on each side of the fuselage of the aircraft. Aircraft 300 further comprises tailpiece 310 and wheels 312 and 314.

Figure 3B:
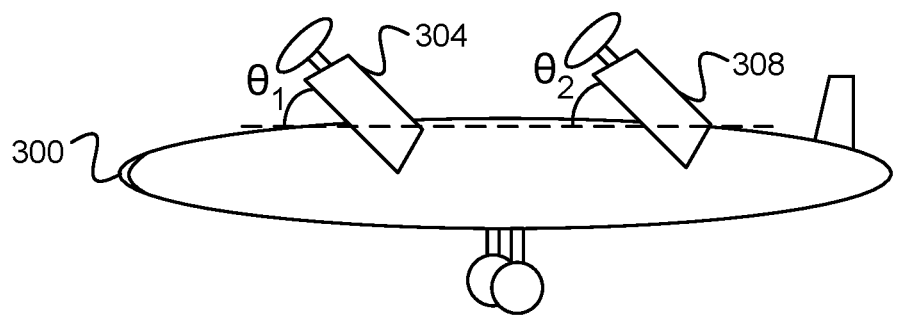
FIG. 3B is a diagram illustrating an embodiment of a tiltwing aircraft.

FIG. 3B is a diagram illustrating an embodiment of a tiltwing aircraft. As shown, wings 304 and 308 are tilted upwards away from the nose of the aircraft. The angle of front wing 304 is shown as $\theta_1$ and the angle of back wing 308 is shown as $\theta_2$. In some embodiments, the wings are tilted at the same angle. In some embodiments, the wings are tilted at different angles. In some embodiments, the aircraft as shown is over-actuated. Multiple combinations of actuators and actuator parameters may achieve an ordered flight trajectory. The described flight control system may determine an optimal combination of actuators and actuator parameters.

Figure 4A:
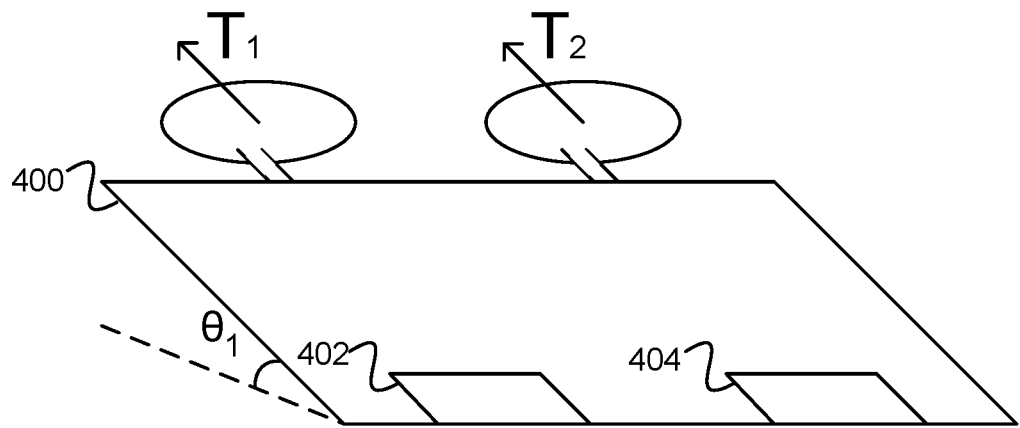
FIG. 4A is a diagram illustrating an embodiment of a tiltwing.

FIG. 4A is a diagram illustrating an embodiment of a tiltwing. Tilt wings may comprise control surfaces, for example flaps or panels. In the example shown, wing 400 is tilted at an angle of $\theta_1$. Two rotors are shown on wing 400. $T_1$ and $T_2$ as shown refer to the respective thrusts of the rotors. The individual thrusts of rotors of the aircraft are solved for. Panels 402 and 404 are shown on wing 400. Panels 402 and 404 may be repositioned during flight to change the flight trajectory. For example, adjusting the angle of the control surfaces may impact lift or efficiency of flight. The panels may be controlled by servomechanisms or electric linear actuators.

Figure 4B:
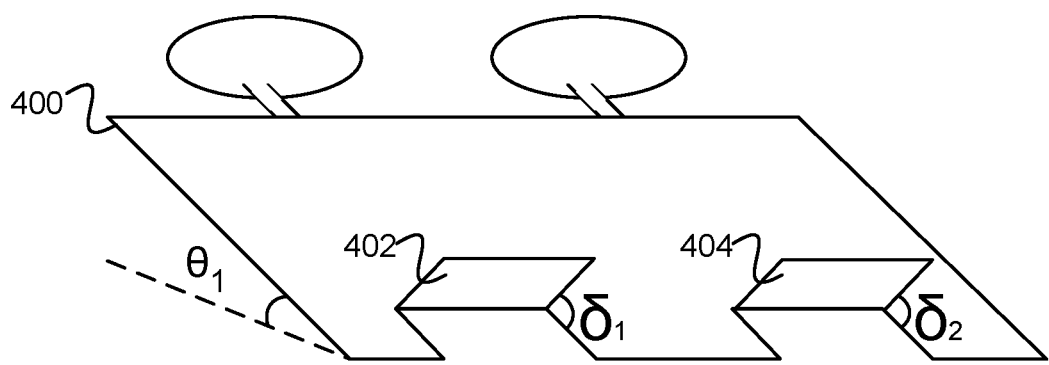
FIG. 4B is a diagram illustrating an embodiment of a tiltwing.

FIG. 4B is a diagram illustrating an embodiment of a tiltwing. In the example shown, panels 402 and 404 are angled away from the body of wing 400. Panel 402 is positioned at an angle of from $\delta_1$ the wing. Panel 404 is positioned at an angle of $\delta_2$ from the wing. The static geometry of the aircraft as well as the dynamic geometry of the aircraft, for example, the angle of the tilt wings and control surfaces, may be used to determine the optimal actuator commands. As part of the geometry-based flight control process, the impact of the dynamic components of the aircraft may be determined each time new flight trajectory instructions are received.

Figure 5:
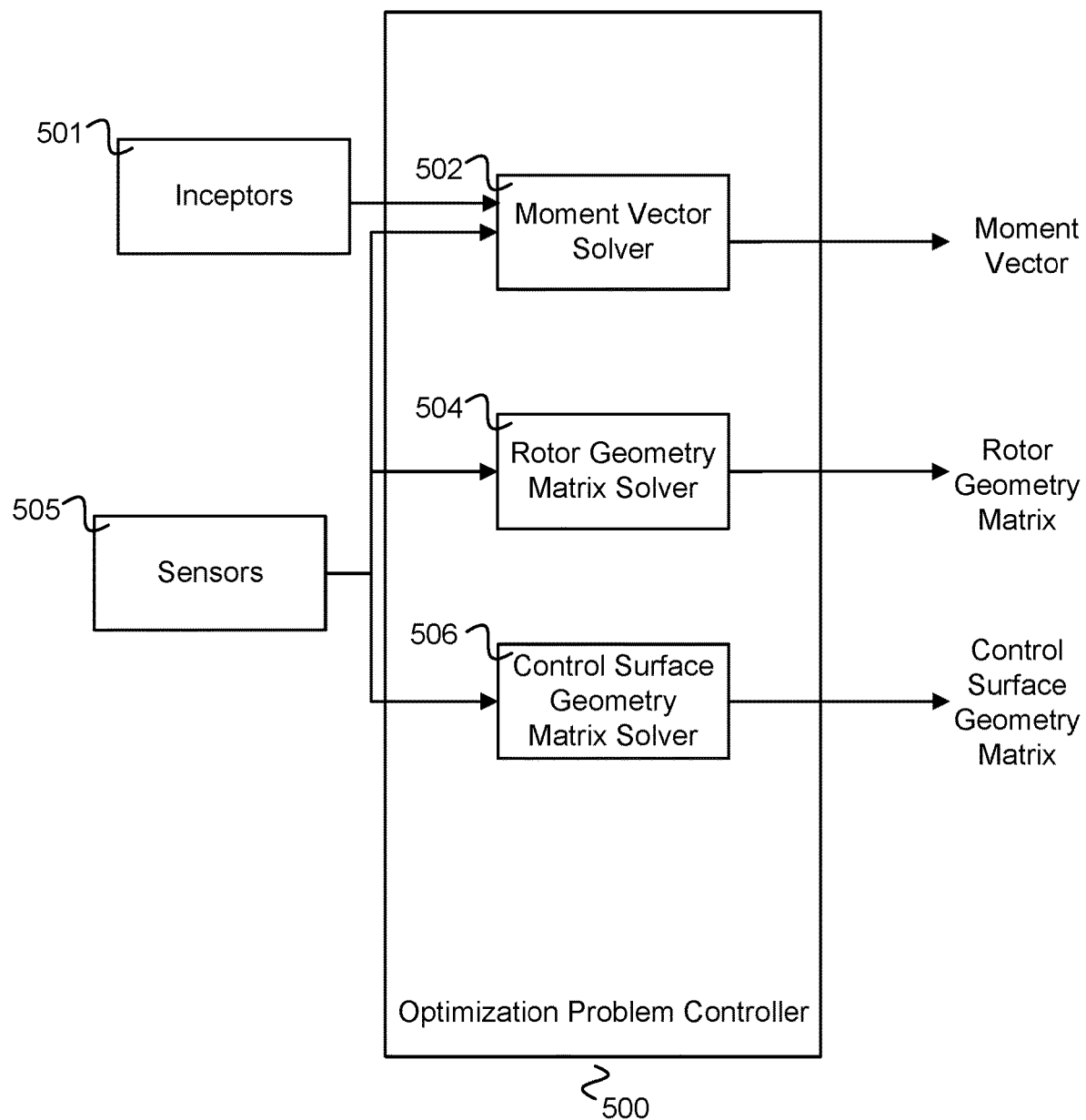
FIG. 5 is a diagram illustrating an embodiment of an optimization problem controller.

FIG. 5 is a diagram illustrating an embodiment of an optimization problem controller. The optimization problem controller may determine an optimization problem based on the aircraft information, wherein solving the optimization problem determines optimal actuator instructions. The optimization problem may comprise the sum of moment error, thrust error, a rotor regularization term, and a control surface regularization term, over which thrusts and control surface angles are minimized. The optimization problem may be structured as shown below:

$$\min_{T,\delta}\left(\frac{1}{2}\|M-(AT+B\delta+c)\|^2_{W_M} + \left(T_{desired}-\sum_i T_i\right)^{2w_T} + \varepsilon_T \sum_i \left(\frac{T_i-T_{min_i}}{T_{max_i}-T_{min_i}}\right)^2 + \varepsilon_\delta \sum_i \left(\frac{\delta_i-\delta_{0_i}}{\delta_{max_i}-\delta_{min_i}}\right)^2\right)$$

subject to $T_{min_i} \leq T_i \leq T_{max_i}$

In which,
M is a moment vector;
A is a rotor geometry matrix;
T is a rotor thrust vector;
B is a control surface geometry matrix;

$\delta$ is a control surface tilt angle vector;
c is an offset vector;
$W_M$ is a moment error weight;
$W_T$ is a thrust error weight;
$\varepsilon_T$ is a rotor regularization error; and
$\varepsilon_\delta$ is a control surface regularization error.

Moment error is represented by $M-(AT+B\delta+c)$. Moment vector M may comprise the required moments and average thrust required for the aircraft to achieve a desired flight trajectory. Moment vector M may comprise moments in three axes Mx, My, Mz and a thrust. In the example shown, moment vector solver 502 receives inputs from inceptors 501 and sensors 505 and outputs the moment vector.

A geometry matrix as described is equivalent to a performance matrix. For example, the matrix contains information pertaining to performance of an actuator based at least in part on the aircraft's geometry. Rotor geometry matrix A may comprise information on the effect of rotors of the aircraft as a function of aircraft geometry. The rotor geometry matrix may be a function of wing tilt angles $\theta_1$ and $\theta_2$ in a tilt wing aircraft. In the example shown, rotor geometry matrix solver 504 receives inputs from sensors 505 and outputs the rotor geometry matrix. Control surface geometry matrix B may comprise information on the effect of control surfaces of the aircraft as a function of aircraft geometry. The control surface geometry matrix may be a function of wing tilt angles $\theta_1$ and $\theta_2$ in a tiltwing aircraft. In the example shown, control surface geometry matrix solver 506 receives inputs from sensors 505 and outputs the control surface geometry matrix. Optimization problem controller 500 comprises moment vector solver 502, rotor geometry matrix solver 504, and control surface geometry matrix solver 506.

Rotor thrust vector T may comprise thrusts of each individual rotor of the aircraft. Each individual rotor thrust may be constrained within shared specified upper and lower bounds ($T_{lower\ bound} \leq T \leq T_{upper\ bound}$) or each rotor may have differing maximum and minimum thrusts. Control surface vector $\delta$ may comprise angles of each individual control surface of the aircraft. Rotor thrust vector T and control surface vector $\delta$ may be solved for after determination of moment vector M, rotor geometry matrix A, and control surface geometry matrix B such that T and $\delta$ are minimized over the optimization problem. Offset vector c may be used to ensure accuracy of the equation. For example, a flap may provide non-zero lift when it is inline with a wing so an offset correctly calibrates the zero lift position. Thrust error is represented by $T_{desired}-\Sigma_i T_i$. The sum of thrusts of all rotors is subtracted from the desired thrust.

Rotor regularization term $$\sum_i \left(\frac{T_i-T_{min_i}}{T_{max_i}-T_{min_i}}\right)^2$$

penalizes having a large spread of rotor utilization. It optimizes for the rotors being roughly similarly utilized, e.g. all rotors engaged between 30% to 40% rather than one rotor utilized at 100% of its possible thrust and other rotors barely utilized. The term accounts for rotors of different sizes by summing the percentage of thrust used for each rotor. The maximum and minimum thrusts of each rotor are considered. In the event all rotors of the aircraft are identical, the term optimizes for a small distribution of thrusts. Similarly, control surface regularization term $$\sum_i \left( \frac{\delta_i - \delta_{0_i}}{\delta_{max_i} - \delta_{min_i}} \right)^2$$

penalizes having a large spread of control surface utilization and accounts for different configurations (e.g. different sizes) of control surfaces. It optimizes for the control surfaces being roughly similarly utilized in proportion to their ranges. In the event all control surfaces of the aircraft are identical, the term optimizes for a small distribution of control surface angles. Term $\delta_{0_i}$ refers to a deflection point or trim condition. It describes the angle of the control surface during cruise.

The weights and errors may be used to tune the optimization problem. For example, $W_M$ may comprise a vector with weights for roll, pitch, and yaw. $W_M$ and $W_T$ may be adjusted such that roll and pitch are weighted over thrust and yaw is weighted the least. The weights may be used to prioritize stability. For example, roll and pitch may be weighed more because they are critical to the aircraft's stability and thrust is not. Errors $\varepsilon_\delta$ and $\varepsilon_T$ may be used to change the priority of the control surface angle distribution and the thrust distribution.

Figure 6:
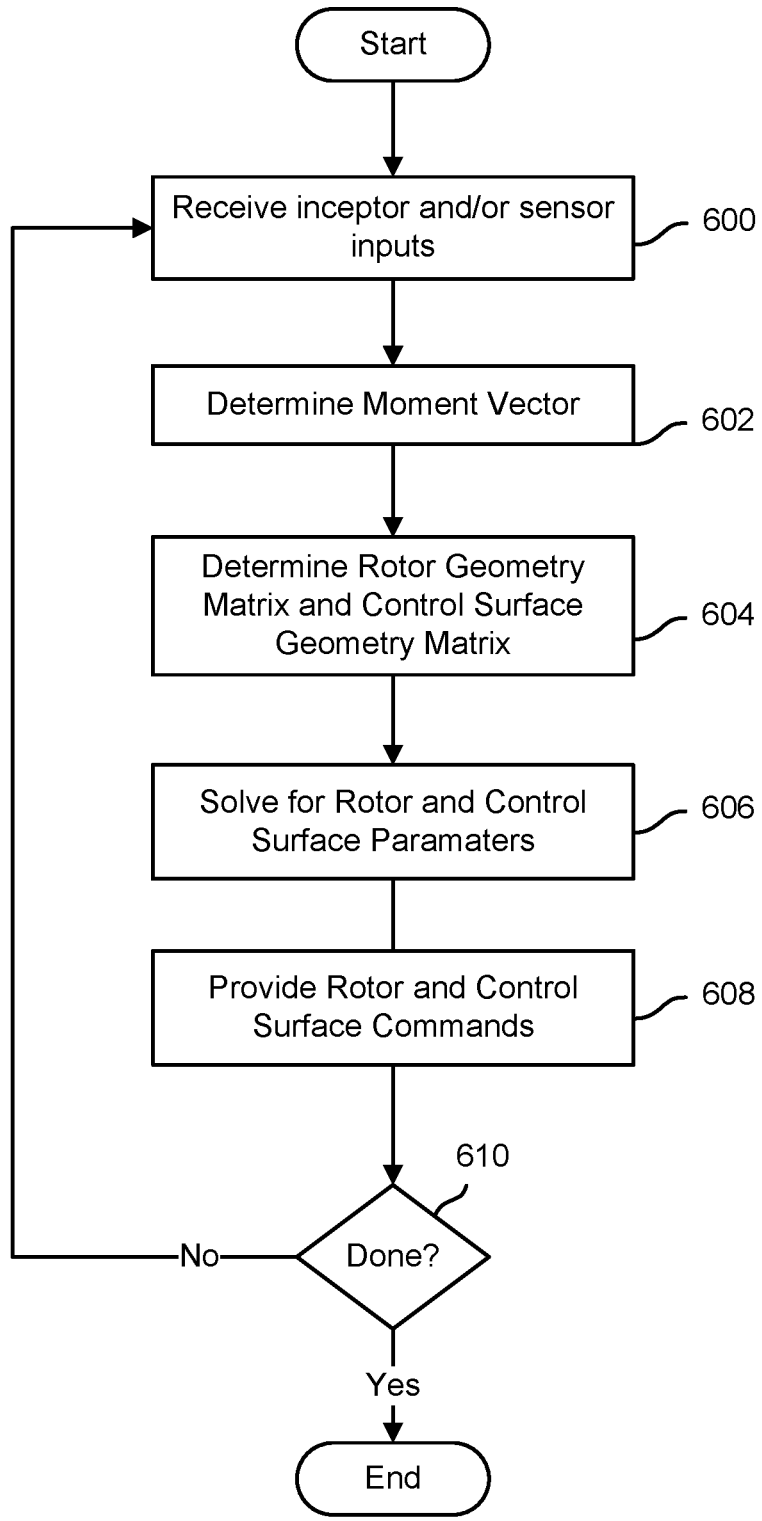
FIG. 6 is a flow diagram illustrating an embodiment of a geometry-based flight control process.

FIG. 6 is a flow diagram illustrating an embodiment of a geometry-based flight control process. At 600, inceptor and/or sensor inputs are received. The inceptor and/or sensor inputs may contain a desired flight trajectory or action. At 602, a moment vector is determined. The moment vector may comprise the required moments and average thrust needed to achieve the desired flight trajectory. At 604, a rotor geometry matrix and control surface geometry matrix are determined. The geometry matrices may be determined based on static and dynamic geometry aspects of the aircraft. In some embodiments, models are determined for the rotors and control surfaces and the models are linearized. The rotor geometry matrix and control surface geometry matrix result from linearizing the models. At 606, rotor and control surface parameters are solved for. They may be solved for by solving an optimization problem based upon the moment vector, rotor geometry matrix, and control surface geometry matrix. At 608, rotor and control surface commands are provided. The aircraft actuators may comprise rotors and control surfaces. In the event that an aircraft comprises other actuators, various relevant geometry matrices and parameters may be determined. Subsequent iterations are repeated until the flight control process is done (610), e.g., the aircraft lands and is shut down.

Figure 7:
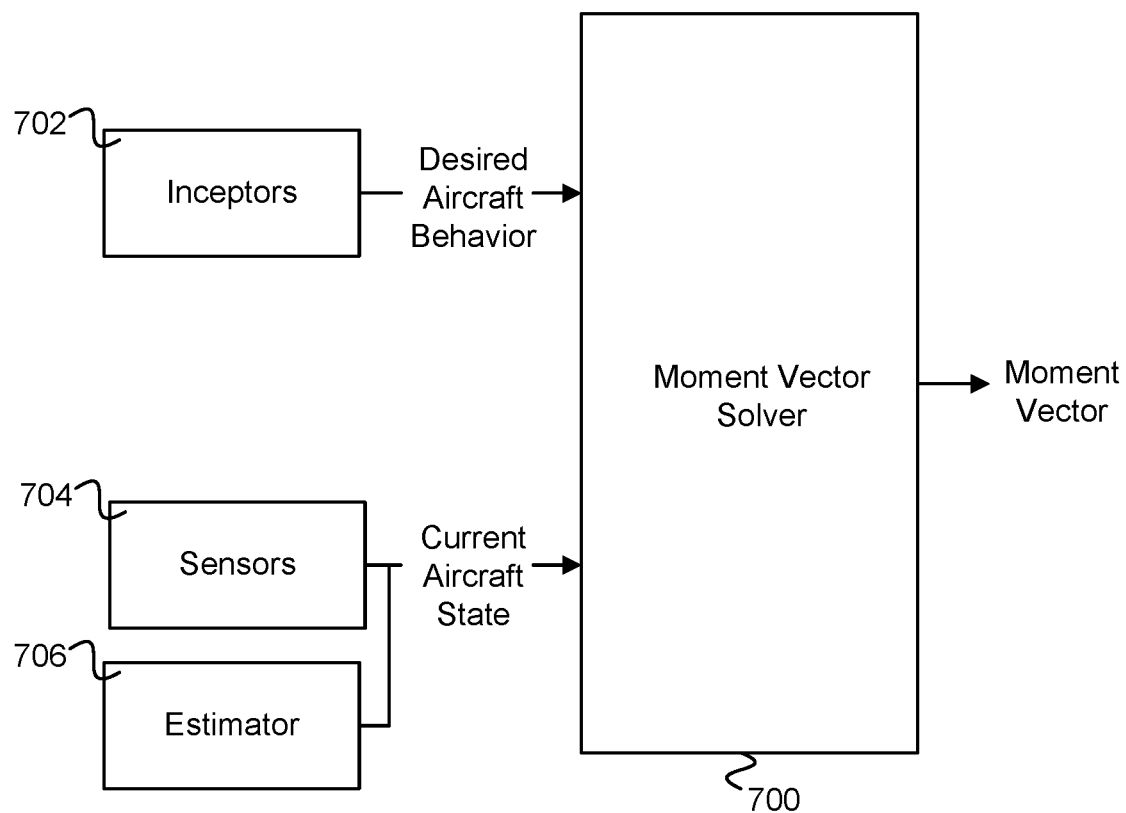
FIG. 7 is a diagram illustrating an embodiment of a moment vector solver.

FIG. 7 is a diagram illustrating an embodiment of a moment vector solver. The moment vector solver may receive a desired flight trajectory and determine the moments and average thrust required to achieve the desired flight trajectory. As shown, moment vector solver 700 outputs a moment vector. In the example shown, inceptors 702 provide desired aircraft behavior to moment vector solver 700. The desired aircraft behavior may comprise aircraft parameters such as a change in yaw, acceleration, or another flight metric. A pilot or remote operator may manipulate inceptors of the aircraft, instructing a desired flight trajectory or desired action for the aircraft. For example, a pilot may turn a steering wheel left by a few degrees, indicating a desired yaw. The moment vector solver may apply a control law to its inputs to determine a moment vector. The moment vector solver may determine the appropriate moments and forces to achieve the desired aircraft parameters based on the aircraft's current state. In the example shown, a current state of the aircraft is received from sensors 704 and estimator 706. In some embodiments, the current state of the aircraft is determined based on sensor data. For example, readings from instruments on the aircraft may determine the tilt of the wings, the speed of the aircraft, and any other appropriate aircraft information. In some embodiments, an estimator provides an estimate of the current aircraft state based on a history of past actuator commands. For example, a model of tiltwing angles may be utilized in addition past commands in order to estimate the current tilt angle.

In some embodiments, the desired flight trajectory may be determined based on sensor data. For example, after an initial destination input, the aircraft may be flown using autopilot. In some embodiments, inceptor inputs may be overridden based on sensor data. For example, in the event sensor data shows an obstacle in a trajectory the pilot has directed the aircraft, a moment vector may be determined that directs the aircraft in a different route.

Figure 8:
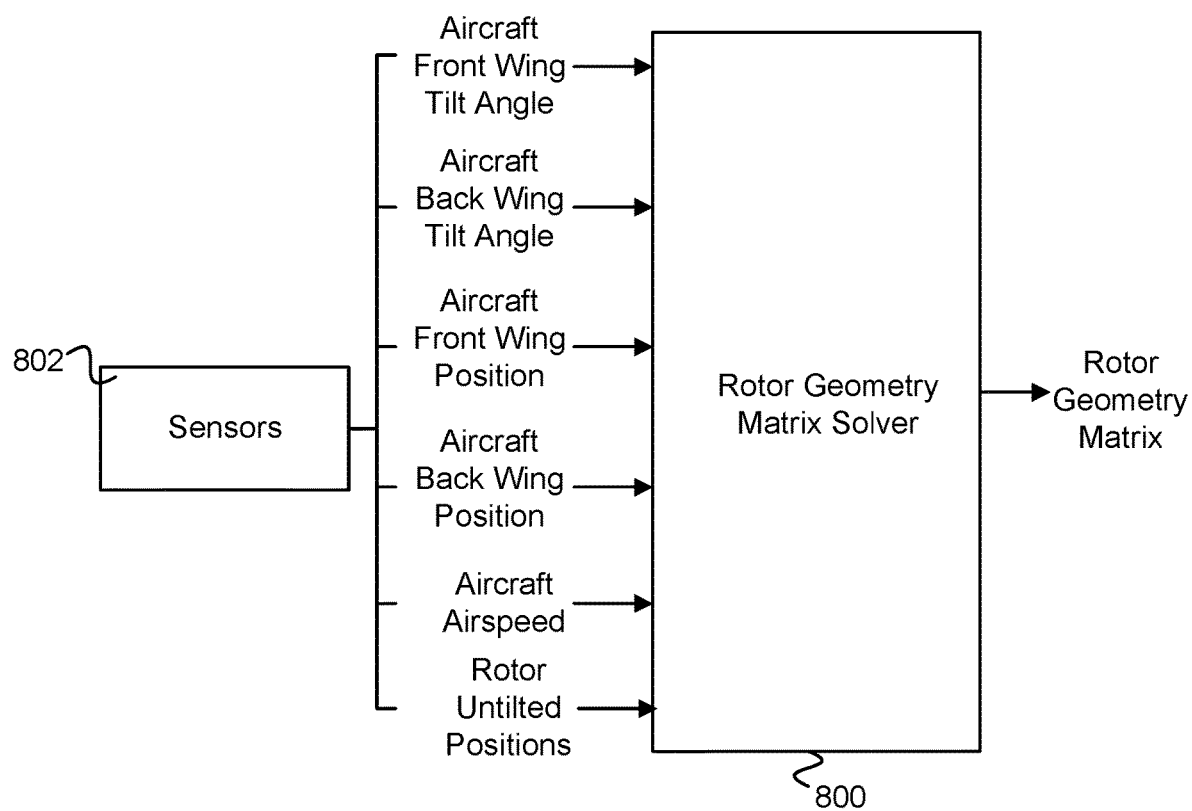
FIG. 8 is a diagram illustrating an embodiment of a rotor geometry matrix solver.

FIG. 8 is a diagram illustrating an embodiment of a rotor geometry matrix solver. In the example shown, rotor geometry matrix solver receives sensor data from sensors 802. The sensor data comprises the aircraft front wing tilt angle, the aircraft back wing tilt angle, the aircraft front wing position, the aircraft back wing position, the aircraft airspeed, and the rotor untilted positions among other metrics. In various embodiments, various types of sensor data are used. For example, a rotor tilt angle would be considered for a tilt rotor aircraft whereas a wing tilt angle would not be used. Based on the sensor data, the rotor geometry matrix solver outputs a rotor geometry matrix.

The rotor geometry matrix solver may first determine a model for rotor behavior. In some embodiments, the model is determined applying the equation $\bar{r} \times T_i \hat{t}$ to each rotor of the aircraft. Thrust offset $\bar{r}$ describes the rotor location compared to a center of gravity of the aircraft. Thrust direction $\hat{t}$ describes the directionality of the rotor's thrust. Rotor thrust $T_i$ is the rotor's thrust (to be solved for). The thrust offset and thrust direction may comprise spatial rotation information. The model may change based on changes in the aircraft's state. For example, a new wing tilt angle, new rotor tilt angle, or new airspeed may change the model. Linearizing the model for one rotor may provide one row of the rotor geometry matrix. The process may be repeated for each rotor until the rotor geometry matrix is complete.

Figure 9:
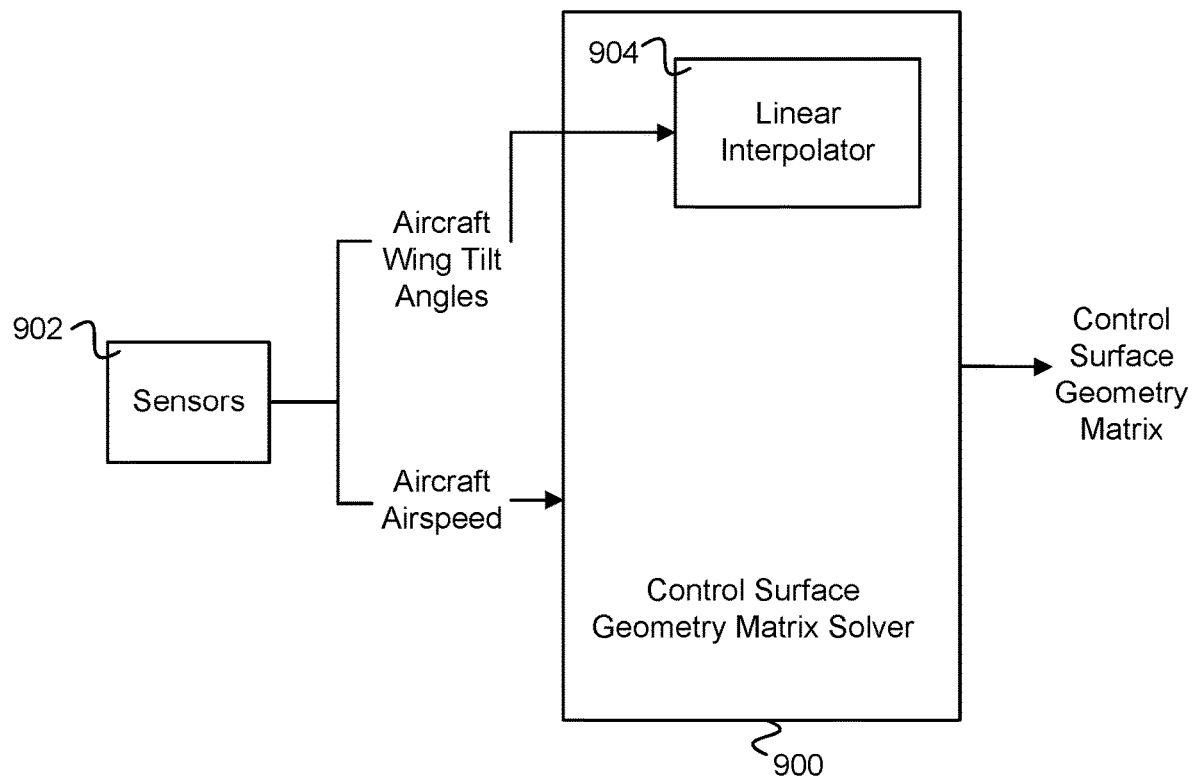
FIG. 9 is a diagram illustrating an embodiment of a control surface geometry matrix solver.

FIG. 9 is a diagram illustrating an embodiment of a control surface geometry matrix solver. In the example shown, sensors 902 provide sensor data to control surface geometry matrix solver 900, which outputs a control surface geometry matrix. The sensor data for a tiltwing aircraft comprises aircraft wing tilt angles and aircraft airspeed. Airspeed may be measured using a pitot tube or sensor. In some embodiments, the airspeed is interpolated based on the wing tilt angle of the aircraft. Sensors may be inaccurate in determining airspeed. The airspeed may be estimated based on a known relationship between wing tilt angle and airspeed. In the example shown, control surface geometry matrix solver comprises linear interpolator 904, which receives aircraft wing tilt angles.

In some embodiments, past commands are used to determine the aircraft's current position and parameters rather than sensor data. Past actuator commands may be analyzed to determine a current state of the aircraft. In some embodiments, sensor data is used estimate or determine specific aircraft parameters or position data that cannot be captured via sensors. For example, wind speed sensors may be unreliable. Global positioning system (GPS) data may be used to determine wind speed.

The control surface geometry matrix solver may first determine a model for control surface behavior and linearize the model to solve for the matrix. In some embodiments, the model is determined applying the equation $\bar{r} \times \partial_i \hat{t}$ to each control surface of the aircraft. Lift offset $\bar{r}$ describes the control surface location compared to a center of gravity of the aircraft. Lift direction $\hat{t}$ describes the directionality of the lift caused by the control surface deflection. Control surface angle $\partial_i$ is the control surface angle (to be solved for). The lift offset and lift direction may comprise spatial rotation information. The model may change based on changes in the aircraft's state. For example, a new wing tilt angle, new rotor tilt angle, or new airspeed may change the model. Under high airspeeds, a small deflection in a control surface has a larger impact on aircraft flight as compared low airspeeds. Linearizing the model for one control surface may provide one row of the control surface geometry matrix. The process may be repeated for each rotor until the control surface geometry matrix is complete.

Figure 10:
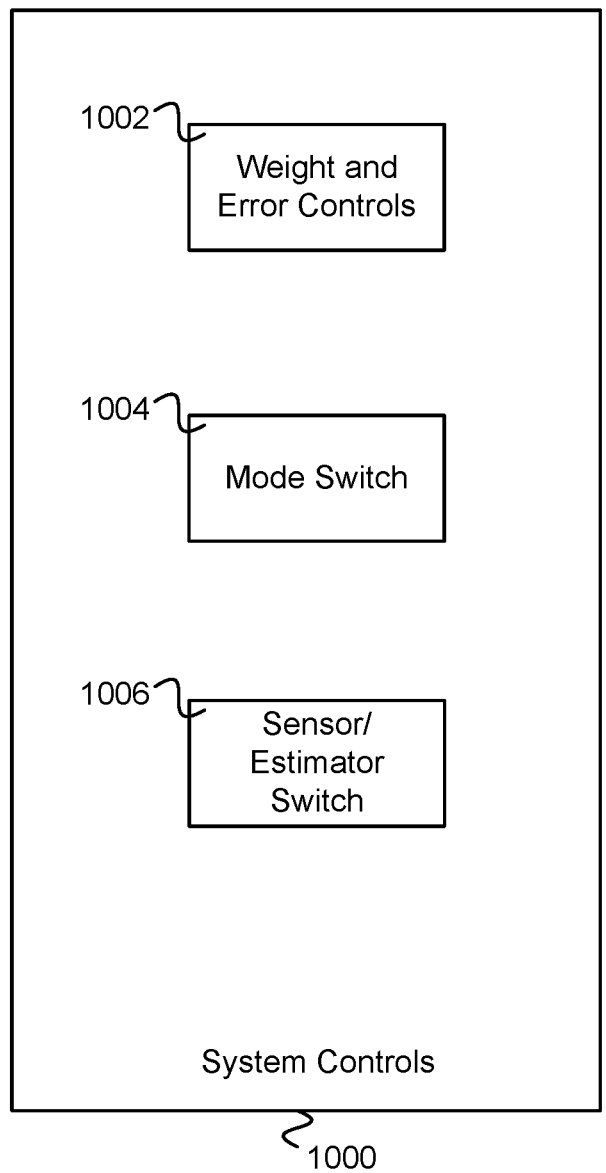
FIG. 10 is a diagram illustrating an embodiment of system controls.

FIG. 10 is a diagram illustrating an embodiment of system controls. In the example shown, system controls 1000 comprise weight and error controls 1002, mode switch 1004, and sensor/estimator switch 1006. The system controls may be used to specify restrictions or considerations for the aircraft's flight trajectory. The system controls may alter the optimization problem and affect the determined actuator commands. The system controls may be embodied in a graphic user interface. In some embodiments, the system controls may be changed while in the aircraft is mid-flight. In some embodiments, the system controls are changed based on sensor data or information regarding the aircraft's current state (e.g. attitude, position, airspeed, tilt angles). The system controls may be remotely changed, changed by a pilot, or changed by autopilot software.

Error controls 1002 may be used to change error and weight values in the optimization problem, such as values $\varepsilon_\delta$, $\varepsilon_T$, $W_T$, and $W_M$. The error and weight values may be manipulated to establish a hierarchy of prioritization of roll, pitch, yaw, and thrust. The values may be set in order to artificially constrain the aircraft. Artificially constraining the aircraft may diminish the number of possible solutions to the optimization problem, allowing it to be solved faster. Artificially constraining the aircraft may provide buffer room in case the aircraft experiences an emergency and needs extra power.

The error controls may be used to establish minimum and maximum rotor thrust values. The error controls may also be used to determine a distribution of rotor thrusts. For example $T_{mean} - \varepsilon_2 \leq T \leq T_{mean} + \varepsilon_2$ may be included in the optimization problem, wherein $\varepsilon_2$ is an error value used to ensure the ordered rotor thrusts are roughly evenly distributed. Providing a roughly even distribution of rotor thrusts may spread the load or torque evenly among the rotors and also prevent the optimization problem from becoming a nonconvex program that has multiple solutions.

Mode switch 1004 may comprise various modes of flight. The mode switch may comprises various modes or settings of autopilot. Different preferences of flight selected via the mode switch may change the moment vector. For example, a smooth ride mode may result in differing actuator commands than a sport ride mode.

Sensor/estimator switch 1006 may be used to determine whether the geometry-based flight control system relies on aircraft state/position information from sensor data or from an estimator that analyses past actuator commands to determine an estimate of the aircraft state/position.

Figure 11:
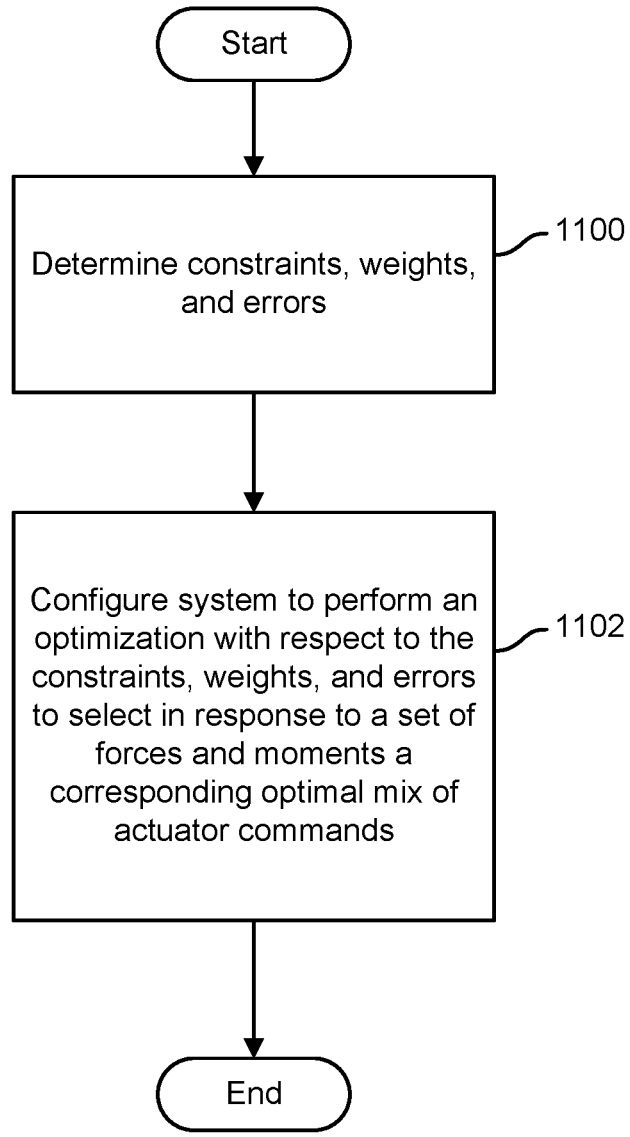
FIG. 11 is a diagram illustrating an embodiment of a process to configure a geometry-based flight control system.

FIG. 11 is a diagram illustrating an embodiment of a process to configure a geometry-based flight control system. At 1100, constraints, weights, and errors are determined. At 1102, the system is configured to perform an optimization with respect to the constraints, weights, and errors to select in response to a set of forces and moments a corresponding optimal mix of actuator commands. The constraints, weights, and errors may be used to fine tune the optimization problem to achieve the desired actuator commands under the pertinent circumstances.

Figure 12:
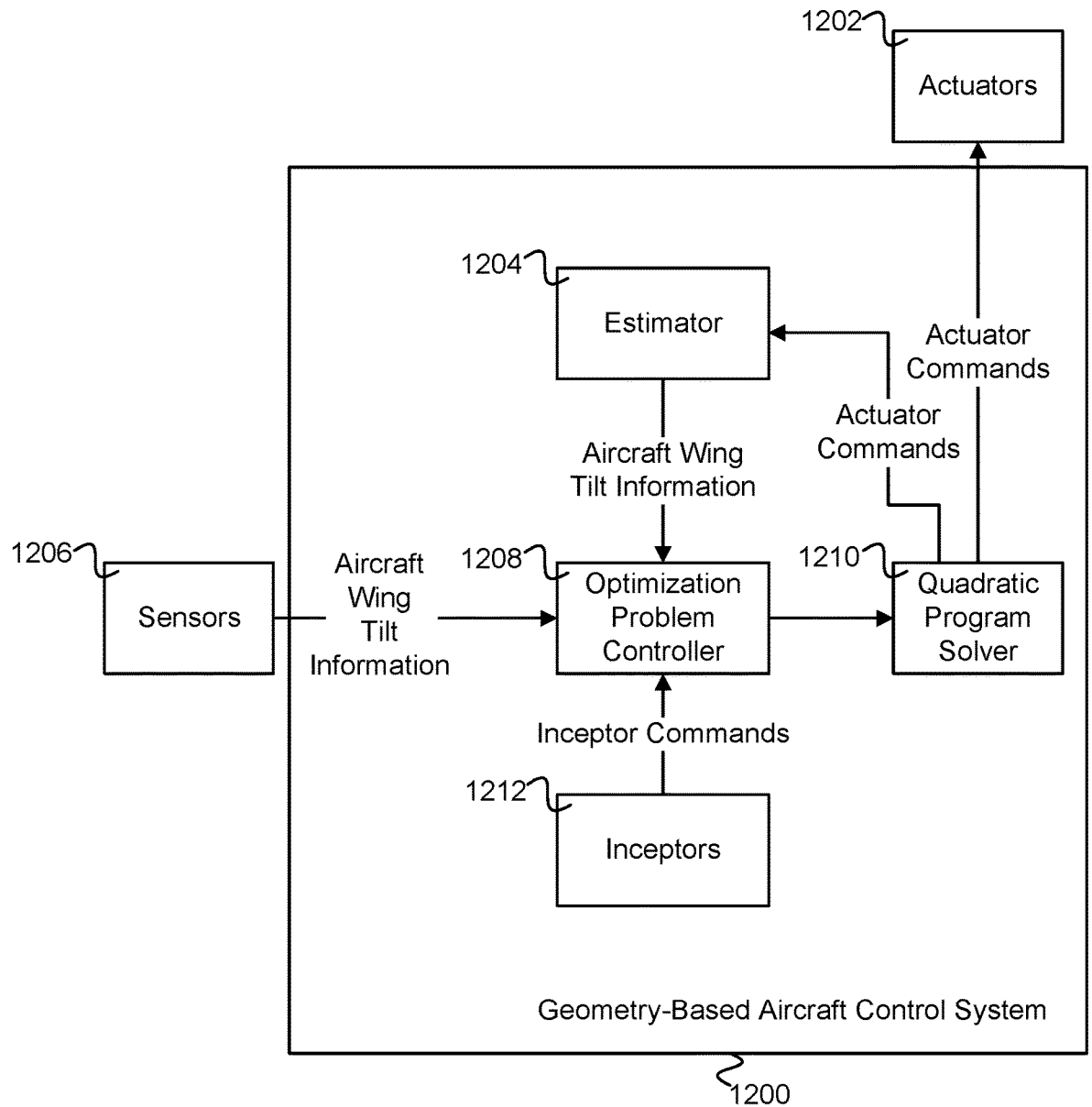
FIG. 12 is a diagram illustrating an embodiment of a geometry-based flight control system.

FIG. 12 is a diagram illustrating an embodiment of a geometry-based flight control system. In the example shown, geometry-based flight control system 1200 comprises estimator 1204, optimization problem controller 1208, quadratic program solver 1210, and inceptors 1212. Sensors 1202 provide aircraft wing tilt information to optimization problem controller 1208. Based on the aircraft wing tilt information and inceptor commands received from inceptors 1212, the optimization problem controller determines an optimization problem. Rotor geometry matrix A and control surface geometry matrix B may be non-linear models or functions that are programmed to model the actuator response based on the aircraft's geometry. The optimization problem controller may comprise software that linearizes the functions or models into matrices. The models may be linearized based on the current positioning of dynamic components of the aircraft (e.g. wing tilt angle). Following linearization based on the dynamic state, the optimization problem may be solved using quadratic problem solver 1210. The optimization problem may be formatted as a linear problem that is able to be solved using a quadratic problem solver. The quadratic problem solver as shown provides actuator commands to actuators 1202. Actuator commands may also be provided to estimator 1204, which determines an estimate of the current aircraft state based on past commands. Optimization problem controller 1208 may utilize aircraft wing tilt information and other aircraft state information based on estimator outputs, sensor outputs, or both.

Figure 13:
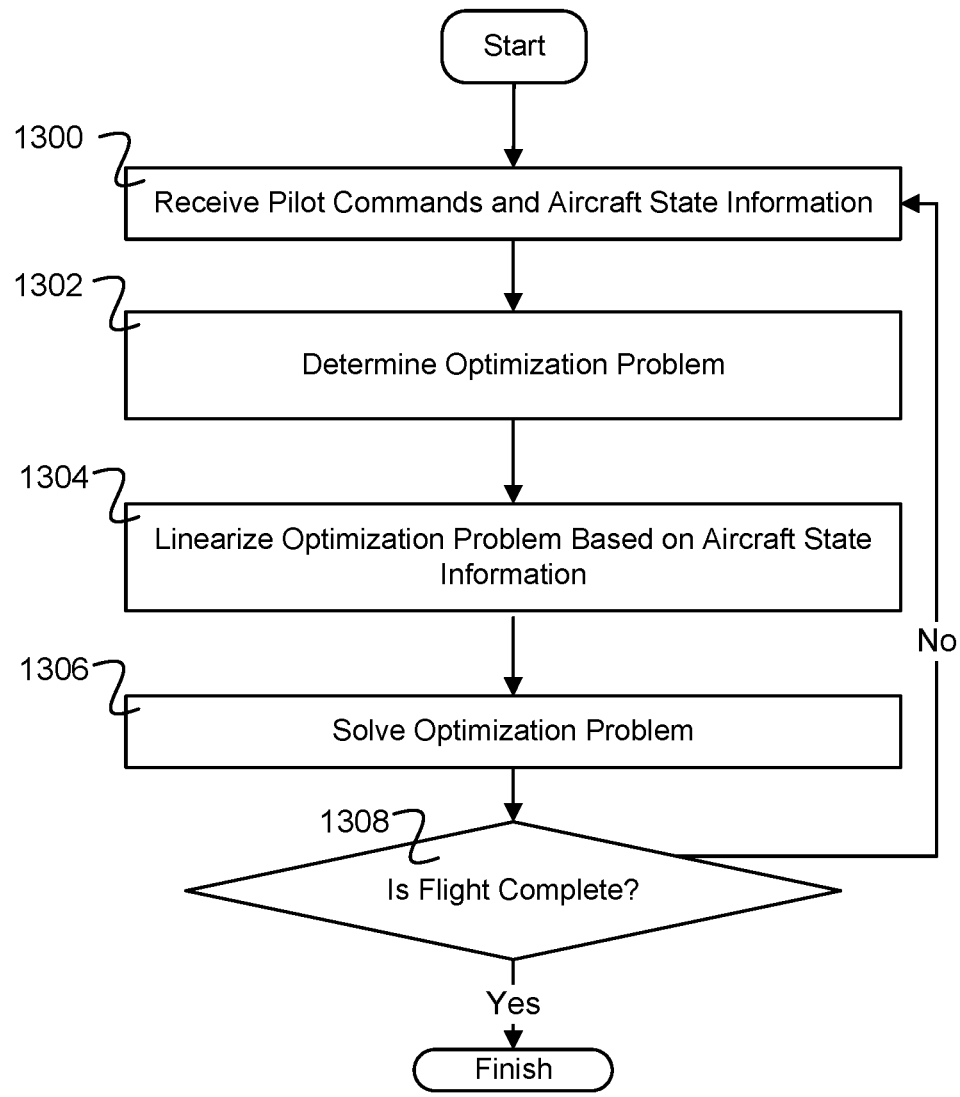
FIG. 13 is a flowchart illustrating an embodiment of a geometry-based flight control process.

FIG. 13 is a flowchart illustrating an embodiment of a geometry-based flight control process. An iteration of the process may be performed at predetermined time intervals or each time new inceptor or autopilot inputs are received. For example, the system may run at 100 Hz. At 1300, pilot commands and aircraft state information are received. At 1302, an optimization problem is determined. The optimization problem may comprise non-linear models. In some embodiments, a moment vector is determined anew in each iteration based on inputted inceptor commands or autopilot commands. Models for the rotors and control surfaces may be determined anew in each iteration based on the aircraft's current state. The models may be functions of the aircraft's dynamic geometry. At 1304, the optimization problem is linearized based on aircraft state information. For example, the optimization problem may be linearized based on the wing tilt angle(s) of the aircraft and many other factors. Linearizing the optimization problem may comprise linearizing non-linear models (e.g. rotor or control surface models) into matrices. At 1306, the optimization problem is solved. At 1308, it is determined whether flight is complete. Subsequent iterations are repeated until it is determined that flight is complete.

Figure 14:
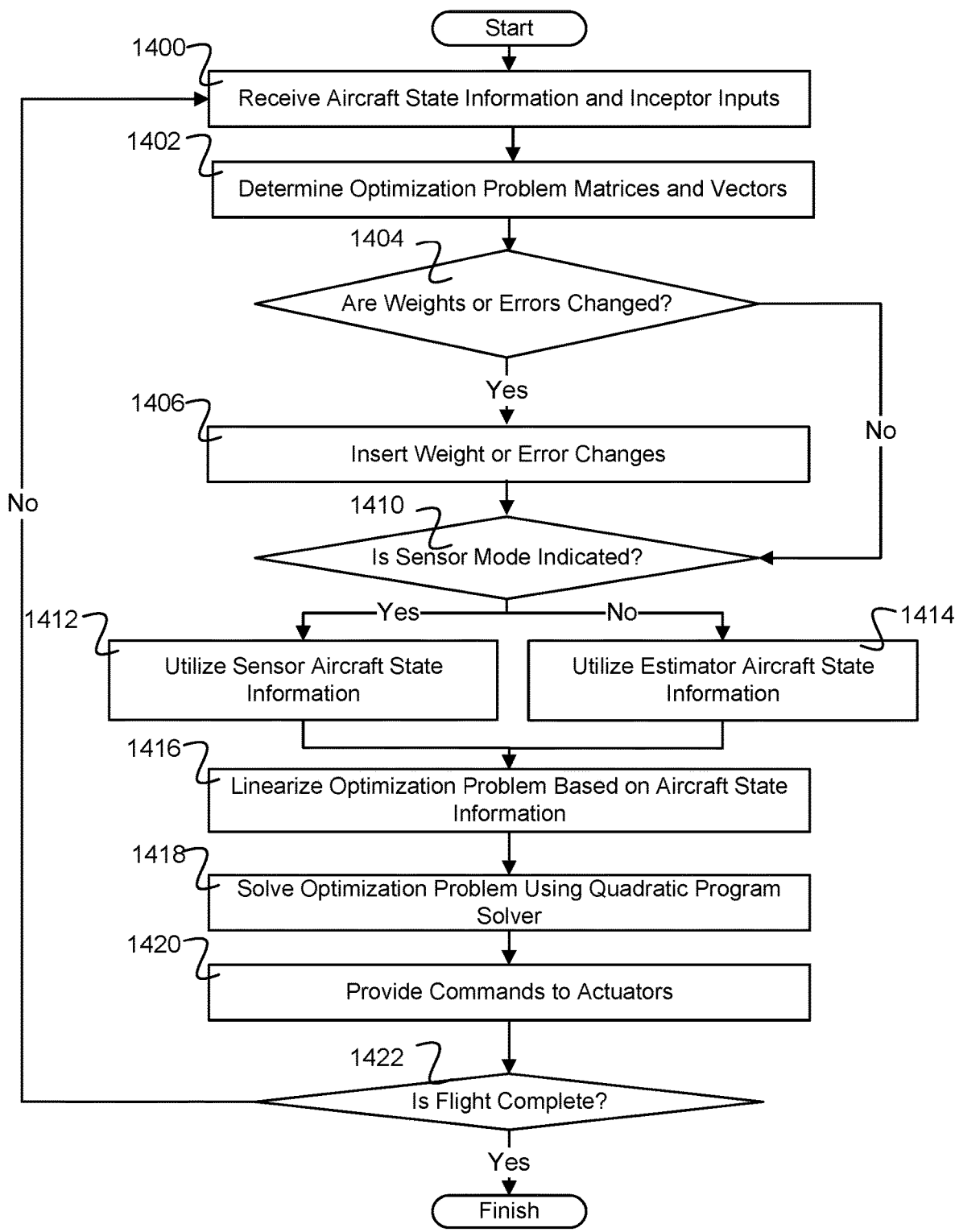
FIG. 14 is a flowchart illustrating an embodiment of a geometry-based flight control process.

FIG. 14 is a flowchart illustrating an embodiment of a geometry-based flight control process. At 1400, aircraft state information and inceptor inputs are received. At 1402, optimization problem matrices and vectors are determined. At 1404, it is determined whether weights or errors have been changed. In the event a change has occurred, at 1406 the weight or error change(s) are inserted. Following weight and error change determination and possible insertion, at 1410 it is determined whether sensor mode is indicated. In the event sensor mode is indicated, at 1412 sensor aircraft state information is utilized. In the event sensor mode is not indicated, at 1414 estimator aircraft state information is utilized. Mode switch determinations may also be considered. Following 1412 or 1414, at 1416 the optimization problem is linearized based on aircraft state information. At 1418, the optimization problem is solved using a quadratic program solver. At 1420, commands are provided to actuators. At 122, it is determined whether flight is complete. Subsequent iterations are repeated until it is determined that flight is complete.

Figure 15:
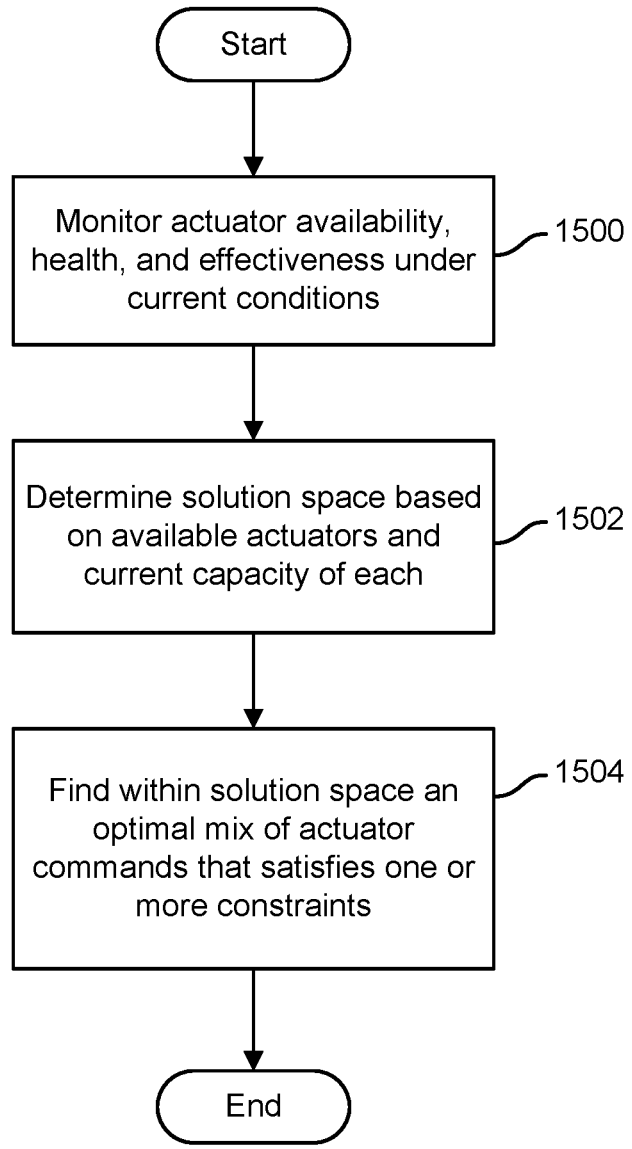
FIG. 15 is a flowchart illustrating an embodiment of a geometry-based flight control process.

FIG. 15 is a flowchart illustrating an embodiment of a geometry-based flight control process. At 1500, actuator availability, health, and effectiveness are monitored under current conditions. For example, a speed controller for a rotor may report to the geometry-based flight control system in the event the rotor is not working. At 1502, a solution space based on available actuators and current capacity of each is determined. For example, a broken rotor may be entered as a zero in the determined optimization problem. Detection of a broken actuator may trigger automatic changes in the optimization problem controller. The optimization continues while using the remaining actuators. At 1504, within the solution space an optimal mix of actuator commands that satisfies one or more constraints is found.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of controlling flight of an aircraft, comprising:
   receiving a set of inputs associated with a requested set of forces and moments to be applied to the aircraft; and
   computing a mix of actuators and associated actuator parameters based on a dynamic state of the aircraft, wherein the computing of the mix of actuators and the associated actuator parameter includes:
   computing the moment vector based on a current state of the aircraft, wherein the current state of the aircraft is determined based on sensor data and an estimate of the current state of the aircraft, the sensor data including a first wing tilt angle and a second wing tilt angle, wherein the first wing tilt angle relates to an angle of a front wing, and wherein the second wing tilt angle relates to an angle of a back wing;
   determining a rotor geometry matrix based on the first wing tilt angle and the second wing tilt angle, a front wing position, a back wing position, and an aircraft airspeed, wherein the rotor geometry matrix is determined by applying an equation to a rotor of the aircraft, wherein the equation includes a thrust offset, a thrust direction, and a rotor thrust, wherein the thrust offset relates to a rotor location compared to a center of gravity of the aircraft, wherein the thrust direction relates to a directionality of a thrust of the rotor, and wherein the rotor thrust relates to the thrust of the rotor;
   computing the control surface performance matrix based on the first wing tilt angle and the second wing tilt angle; and
   updating the mix of actuators and the associated actuator parameters based on the control surface performance matrix, the rotor geometry matrix, and the moment vector; and
   providing an output comprising one or more control signals for the associated actuator parameters computed for the actuators.

2. The method of claim 1, wherein the dynamic state of the aircraft comprises a wing tilt angle or rotor tilt angle, wherein the wing tilt angle includes the first wing tilt angle and the second wing tilt angle.

3. The method of claim 1, wherein the mix is computed at least in part by formulating an associated optimization problem as a quadratic program.

4. The method of claim 3, wherein formulating the associated optimization problem comprises linearizing a non-linear model for actuator performance.

5. The method of claim 4, wherein the non-linear model for actuator performance is determined based on the dynamic state.

6. The method of claim 4, wherein the non-linear model for actuator performance is determined based on spatial rotation information.

7. The method of claim 4, wherein the non-linear model for actuator performance is computed onboard the aircraft in real time.

8. The method of claim 3, wherein the associated optimization problem is computed onboard the aircraft in real time.

9. The method of claim 1, wherein the mix is computed at least in part by formulating an associated optimization problem comprising a rotor performance matrix, control surface performance matrix, and the requested set of forces and moments to be applied to the aircraft.

10. The method of claim 1, wherein computing the mix includes determining a set of thrusts for rotors of the aircraft and a set of angles for control surfaces of the aircraft.

11. The method of claim 1, wherein the mix is computed at least in part by determining a model for rotor performance based on the dynamic state of the aircraft.

12. The method of claim 1, wherein the mix is computed at least in part by determining a model for control surface performance based on the dynamic state of the aircraft.

13. The method of claim 1, wherein computing the mix includes optimizing for an equal utilization of all rotors relative to their maximum and minimum thrusts.

14. The method of claim 1, wherein computing the mix includes optimizing for an equal utilization of all control surfaces relative to their maximum and minimum possible angles.

15. The method of claim 1, wherein computing the mix includes determining weights to prioritize roll, pitch, yaw, and thrusts in relation to each other.

16. The method of claim 1, wherein computing the mix includes monitoring actuator health and adjusting an associated optimization problem accordingly.

17. The method of claim 1, wherein a wing tilt angle of the aircraft is determined based on past actuator commands.

18. The method of claim 1, wherein aircraft airspeed is interpolated based on a wing tilt angle of the aircraft, wherein the wing tilt angle includes the first wing tilt angle and the second wing tilt angle.

19. An aircraft flight control system, comprising:
an interface configured to receive a set of inputs associated with a requested set of forces and moments to be applied to the aircraft; and
a processor coupled to the interface and configured to:
compute a mix of actuators and associated actuator parameters based on a dynamic state of the aircraft, wherein the computing of the mix of actuators and the associated actuator parameter includes to:
compute the moment vector based on a current state of the aircraft, wherein the current state of the aircraft is determined based on sensor data and an estimate of the current state of the aircraft, the sensor data including a first wing tilt angle and a second wing tilt angle, wherein the first wing tilt angle relates to an angle of a front wing, and wherein the second wing tilt angle relates to an angle of a back wing;
determine a rotor geometry matrix based on the first wing tilt angle and the second wing tilt angle, a front wing position, a back wing position, and an aircraft airspeed, wherein the rotor geometry matrix is determined by applying an equation to a rotor of the aircraft, wherein the equation includes a thrust offset, a thrust direction, and a rotor thrust, wherein the thrust offset relates to a rotor location compared to a center of gravity of the aircraft, wherein the thrust direction relates to a directionality of a thrust of the rotor, and wherein the rotor thrust relates to the thrust of the rotor;
compute the control surface performance matrix based on the first wing tilt angle and the second wing tilt angle; and
update the mix of actuators and the associated actuator parameters based on the control surface performance matrix, the rotor geometry matrix, and the moment vector; and
provide an output comprising one or more control signals for the associated actuator parameters computed for the actuators.

20. A computer program product to control flight of an aircraft, the computer program product being embodied in a non-transitory computer readable medium and comprising computer instructions for:
receiving a set of inputs associated with a requested set of forces and moments to be applied to the aircraft; and
computing a mix of actuators and associated actuator parameters based on a dynamic state of the aircraft, wherein the computing of the mix of actuators and the associated actuator parameter includes:
computing the moment vector based on a current state of the aircraft, wherein the current state of the aircraft is determined based on sensor data and an estimate of the current state of the aircraft, the sensor data including a first wing tilt angle and a second wing tilt angle, wherein the first wing tilt angle relates to an angle of a front wing, and wherein the second wing tilt angle relates to an angle of a back wing;
determining a rotor geometry matrix based on the first wing tilt angle and the second wing tilt angle, a front wing position, a back wing position, and an aircraft airspeed, wherein the rotor geometry matrix is determined by applying an equation to a rotor of the aircraft, wherein the equation includes a thrust offset, a thrust direction, and a rotor thrust, wherein the thrust offset relates to a rotor location compared to a center of gravity of the aircraft, wherein the thrust direction relates to a directionality of a thrust of the rotor, and wherein the rotor thrust relates to the thrust of the rotor;
computing the control surface performance matrix based on the first wing tilt angle and the second wing tilt angle; and
updating the mix of actuators and the associated actuator parameters based on the control surface performance matrix, the rotor geometry matrix, and the moment vector; and
providing an output comprising one or more control signals for the associated actuator parameters computed for the actuators.

21. The method of claim 1, wherein the control surface performance matrix is determined by applying another equation to a control surface of the aircraft, wherein the other equation includes a lift offset, a lift direction, and a control surface angle, wherein the lift offset relates to a control surface location compared to the center of gravity of the aircraft, and wherein lift direction relates to a directionality of lift caused by a control surface deflection.

* * * * *